(12) United States Patent
Vasudevarao et al.

(10) Patent No.: US 8,433,425 B2
(45) Date of Patent: Apr. 30, 2013

(54) METHOD, SYSTEM AND COMPUTER PROGRAM PRODUCT FOR DYNAMIC RULE ENGINE FOR A WIND TURBINE FARM

(75) Inventors: Asha Vasudevarao, Andhra Pradesh (IN); Sandeep Kumar Vidiyala, Andhra Pradesh (IN); Savitha Bk, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 13/097,367

(22) Filed: Apr. 29, 2011

(65) Prior Publication Data

US 2012/0066604 A1  Mar. 15, 2012

(51) Int. Cl.
*G05B 11/01* (2006.01)

(52) U.S. Cl.
USPC ............... 700/17; 700/83; 700/287; 290/44

(58) Field of Classification Search ............... 700/17, 700/19, 286, 287; 290/44
See application file for complete search history.

(56) References Cited

U.S. PATENT DOCUMENTS

| | | | |
|---|---|---|---|
| 5,278,773 A | 1/1994 | Cousineau | |
| 6,005,638 A | 12/1999 | Blair et al. | |
| 6,785,637 B1 | 8/2004 | Wobben | |
| 6,864,594 B2 | 3/2005 | Seki | |
| 6,925,385 B2 | 8/2005 | Ghosh et al. | |
| 6,966,754 B2 | 11/2005 | Wobben | |
| 7,013,203 B2 | 3/2006 | Moore et al. | |
| 7,039,631 B1 | 5/2006 | Finger, II | |
| 7,099,800 B2 | 8/2006 | Henriksen et al. | |
| 7,114,174 B1 | 9/2006 | Brooks et al. | |
| 7,199,482 B2 | 4/2007 | Hopewell | |
| 7,698,024 B2 | 4/2010 | Gizara et al. | |
| 2002/0029097 A1 | 3/2002 | Pionzio et al. | |
| 2003/0102675 A1 | 6/2003 | Noethlichs | |
| 2004/0021687 A1 | 2/2004 | Wobben | |
| 2004/0230377 A1* | 11/2004 | Ghosh et al. | 702/3 |
| 2005/0090937 A1* | 4/2005 | Moore et al. | 700/286 |
| 2009/0022589 A1 | 1/2009 | Sorensen | |
| 2009/0153656 A1 | 6/2009 | Sharonova | |
| 2009/0281675 A1* | 11/2009 | Rasmussen et al. | 290/44 |
| 2011/0166717 A1* | 7/2011 | Yasugi | 700/287 |

OTHER PUBLICATIONS

Gregor Giebel et al., Clever Farm—A Super SCADA System for Wind Farms, Riso-R Report, Aug. 2004, pp. 1-57, Riso-E-1444(EN), Riso National Laboratory, Roskilde, Denmark.

* cited by examiner

*Primary Examiner* — Mohammad Ali
*Assistant Examiner* — Nathan Laughlin
(74) *Attorney, Agent, or Firm* — Ernest G. Cusick; Frank A. Landgraff (57) ABSTRACT

In one aspect, embodiments of a method of configuring rules for SCADA data of a wind farm are described. One embodiment comprises receiving supervisory control and data acquisition (SCADA) data for a wind farm comprised of one or more wind turbines. The SCADA data includes parameters for the wind farm. At least a portion of the SCADA data for a selected group of the wind farm parameters is dynamically configured using a graphical user interface (GUI) that interfaces with a rules engine. The SCADA data is configured using one or more operators. At least a portion of the dynamically configured data is output.

19 Claims, 6 Drawing Sheets

---

Receive Supervisory Control And Data Acquisition (SCADA) Data For A Wind Farm Comprised Of One Or More Wind Turbines
602

Configure At Least A Portion Of The SCADA Data Using A GUI That Interfaces With A Rules Engine
604

Output At Least A Portion Of The Configured Data
606

METHOD, SYSTEM AND COMPUTER PROGRAM PRODUCT FOR DYNAMIC RULE ENGINE FOR A WIND TURBINE FARM

FIELD OF THE INVENTION

Embodiments of the present invention are directed to a methods, systems and computer program products for method for monitoring and controlling the operation of a wind turbine or wind turbines, and specifically to a method, system or computer program product for dynamically configuring at least a portion of SCADA data for a selected group of the wind farm parameters using a graphical user interface (GUI) that interfaces with a rules engine.

BACKGROUND OF THE INVENTION

In recent years, reliance upon wind as a source of energy has grown. As reliance upon wind as a source of energy continues to grows, increased efficiency of wind turbines and wind turbine farms increases in importance.

Generally, a wind turbine converts wind energy into rotational energy, and more specifically, converts kinetic energy of wind into mechanical energy. The mechanical energy is used for producing electrical power. Wind turbines may include a rotor having multiple blades that rotate in response to force provided by the wind. Upon rotating the multiple blades, a drive shaft rotates, which in turn drives an electrical generator to generate the electrical power.

A wind farm is a group of interconnected wind turbines at a location. The location of the wind farm may consist of two wind turbines to hundreds of wind turbines. The location of the wind farm may cover a small area of hundreds of square yards (square meters) to an extended area of hundreds of square miles (square kilometers). The location of the wind farm may be located off-shore or near-shore, typically selected to increase the energy of the wind. The location may be selected to increase the energy generated by the wind.

Wind turbines and wind farms can be monitored by a computer system, for example, a Supervisory Control and Data Acquisition system ("SCADA" system). The SCADA system can monitor and control a plant or equipment in industries such as telecommunications, water and waste control, energy, oil and gas refining, transportation. The SCADA system can gather information, such as where a leak on a pipeline has occurred, transfer the information back to a central site, alert a home station that the leak has occurred, carry out necessary analysis and control, such as determining if the leak is critical, and display the information in a logical and organized manner. The SCADA system can be simple, such as a system that monitors environmental conditions of a small office building, or complex, such as a system that monitors all activity in a nuclear power plant or a municipal water system.

As wind turbines and wind farms become more interconnected, larger, and/or more remote, providing performance-related information to an operator about one or more wind turbines or wind farms becomes more important. If the operator receives too little information, then the operator will not be aware of performance-related issues. If the operator receives too much information, then the operator will not be capable of adequately responding to performance-related issues. Furthermore, if the information presented to the operator is not in a format that is useful or comfortable to the operator, then the efficient use of the information can be reduced.

Therefore, what are desired are methods, systems and computer program products that overcome challenges in the art, some of which are described above.

BRIEF DESCRIPTION OF THE INVENTION

Described herein are embodiments of methods, systems or computer program products for dynamically configuring at least a portion of SCADA data for a selected group of the wind farm parameters using a graphical user interface (GUI) that interfaces with a rules engine.

In one aspect, embodiments of a method of configuring rules for SCADA data of a wind farm are described. One embodiment comprises receiving supervisory control and data acquisition (SCADA) data for a wind farm comprised of one or more wind turbines. The SCADA data includes parameters for the wind farm. At least a portion of the SCADA data for a selected group of the wind farm parameters is dynamically configured using a graphical user interface (GUI) that interfaces with a rules engine. The SCADA data is configured using one or more operators. At least a portion of the dynamically configured data is output.

In another aspect, embodiments of systems of configuring rules for SCADA data of a wind farm are described. One embodiment comprises a memory; a display; and a processor, wherein the processor is operably connected with the memory and the display. The processor is configured to receive supervisory control and data acquisition (SCADA) data for a wind farm comprised of one or more wind turbines. The SCADA data includes parameters for the wind farm. The processor is configured to dynamically configure at least a portion of the SCADA data for a selected group of the wind farm parameters using a graphical user interface (GUI) that interfaces with a rules engine. The SCADA data is configured using one or more operators. At least a portion of the dynamically configured data is output using the display.

In yet another aspect, embodiments of a computer program product of configuring rules for SCADA data of a wind farm are described. One embodiment comprises computer-executable code sections stored on a non-transitory computer readable medium. The computer-executable code sections comprise a first section for receiving supervisory control and data acquisition (SCADA) data for a wind farm comprised of one or more wind turbines. The SCADA data includes parameters for the wind farm. The embodiment of a computer program product is further comprised of a second section for dynamically configuring at least a portion of the SCADA data for a selected group of the wind farm parameters using a graphical user interface (GUI) that interfaces with a rules engine. The SCADA data is configured using one or more operators. Further comprising the embodiment of a computer program product is a third section for outputting at least a portion of the dynamically configured data.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods, systems and computer program products.

Wherever possible, the same reference numbers will be used throughout the drawings to represent the same parts.

DETAILED DESCRIPTION OF THE INVENTION

Before the present methods, systems and computer program products are disclosed and described, it is to be understood that the methods, systems and computer program products are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, systems and computer program products. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
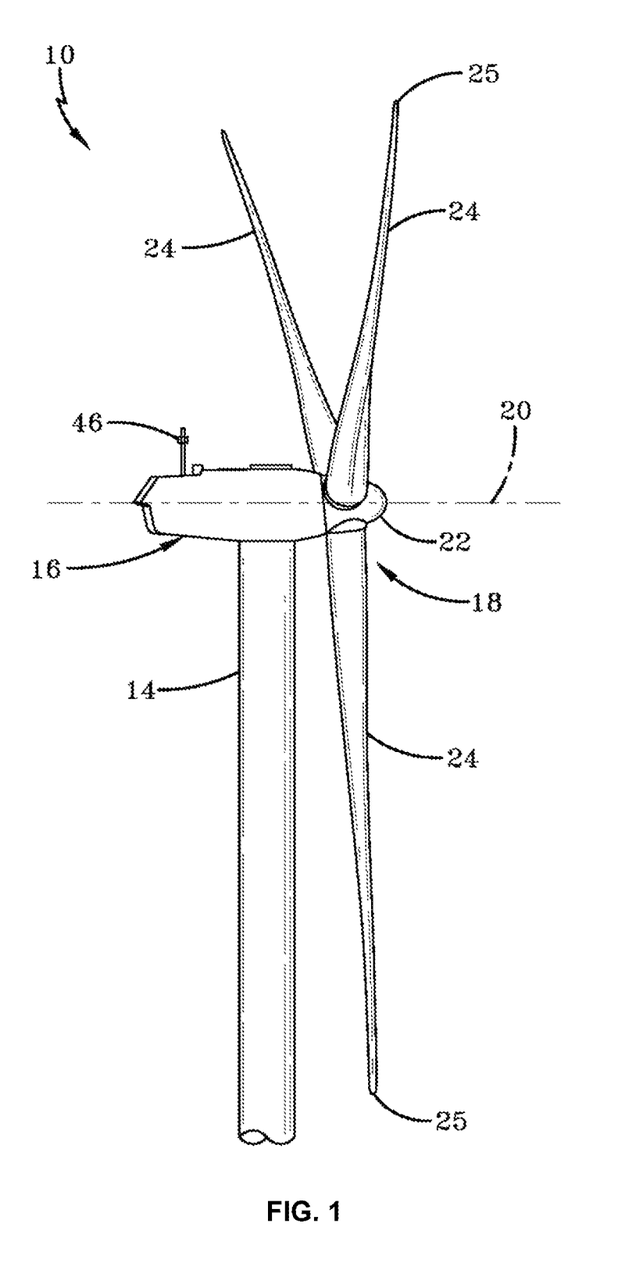
FIG. 1 is a perspective view of an exemplary embodiment of a wind turbine in accordance with the present disclosure.
Figure 2:
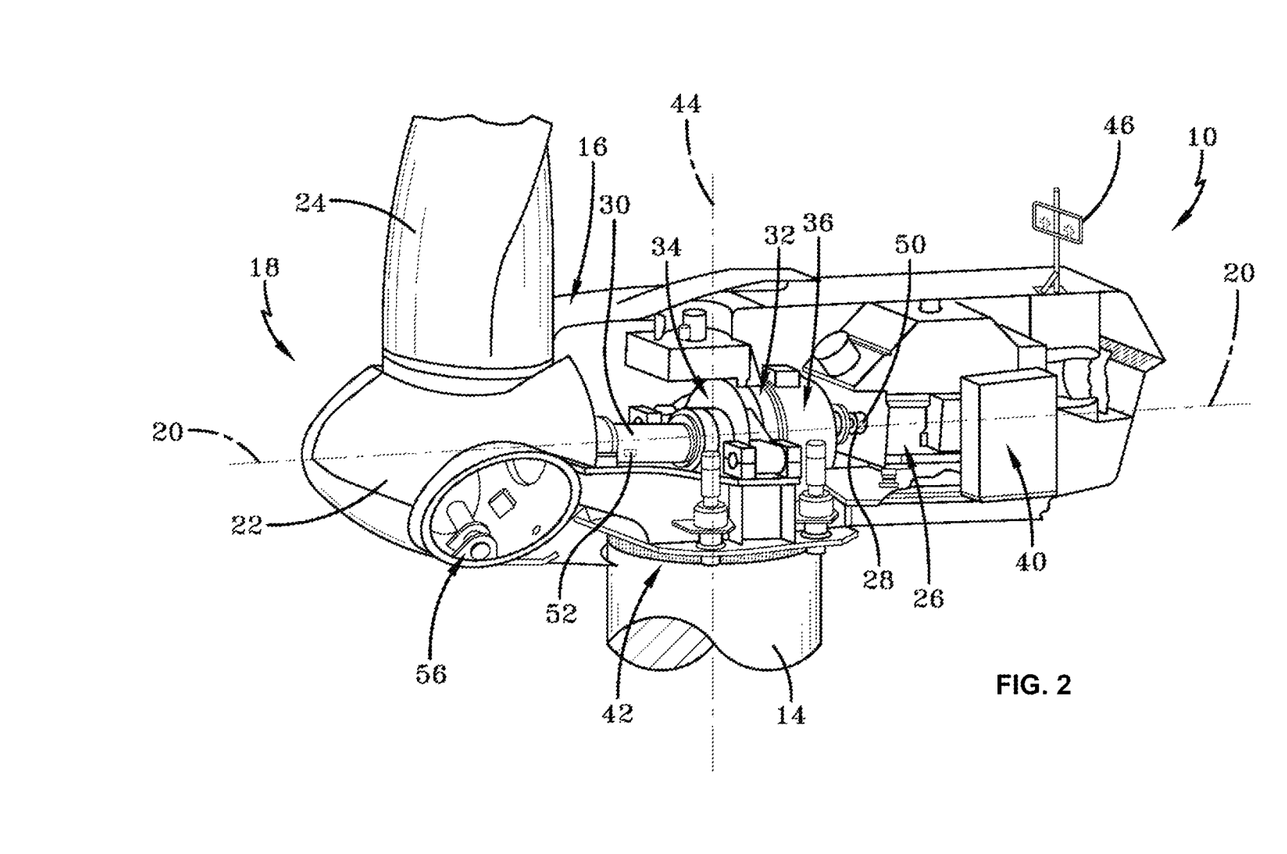
FIG. 2 is a partially cut-away perspective view of a portion of the wind turbine shown in FIG. 1 in accordance with the present disclosure.
Figure 3:
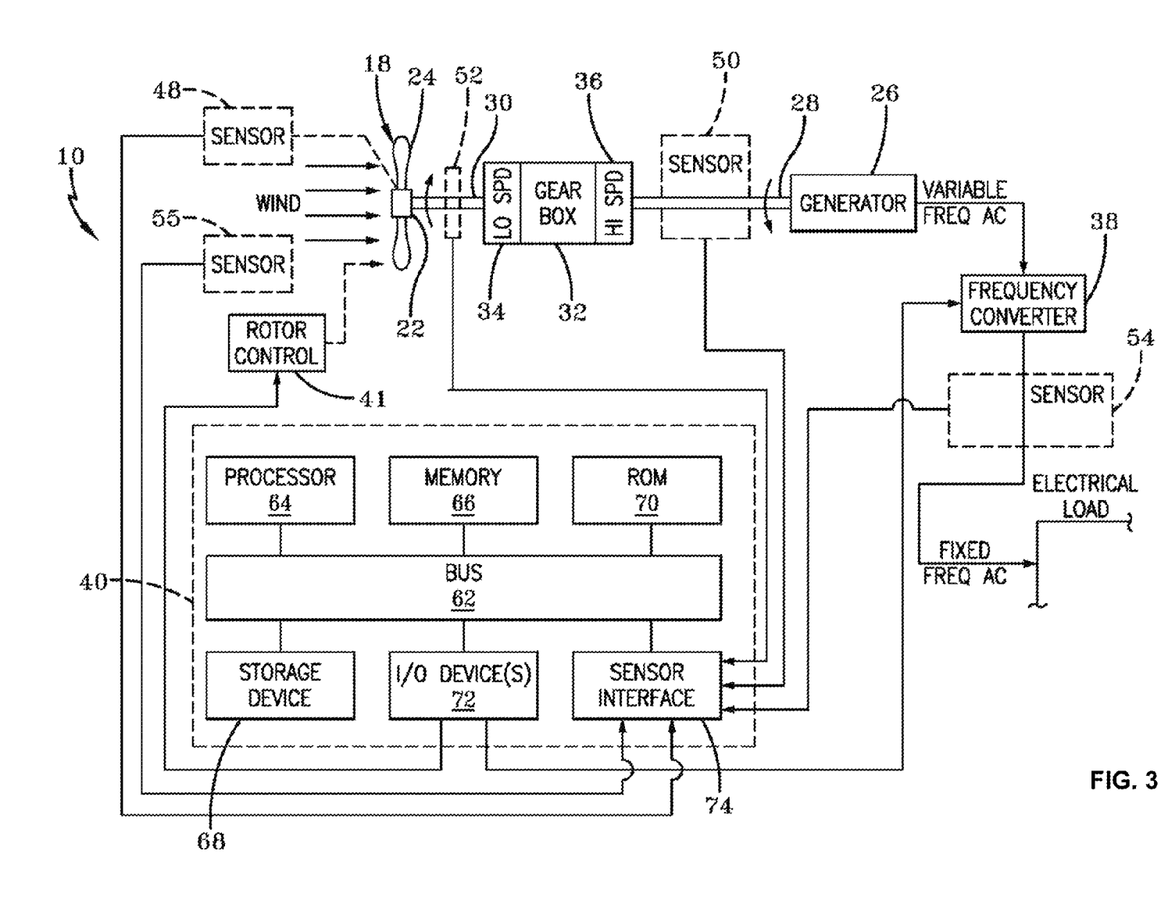
FIG. 3 is a schematic diagram of a wind turbine in accordance with the present disclosure.

FIG. 1 is a perspective view of an exemplary wind turbine 10 in accordance with an embodiment of the present disclosure. FIG. 2 is a partially cut-away perspective view of a portion of an exemplary wind turbine 10 in accordance with an embodiment of the present disclosure. FIG. 3 is a schematic diagram of an exemplary wind turbine 10. According to embodiments of the present disclosure, a desired amount of performance-related information may be provided to an operator, trip events may be reduced by identifying performance-related issues, efficiency may be improved through the ability of an operator to configure desired information through the use of a graphical user interface (GUI) in concert with a rules engine.

The exemplary wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, the exemplary wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm".

The exemplary wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof, which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a Darrieus wind turbine, sometimes referred to as an "eggbeater" turbine. Yet another example of a type, shape, and/or configuration of rotor blades 24 is a Savonious wind turbine. Even another example of another type, shape, and/or configuration of rotor blades 24 is a traditional windmill for pumping water, such as, but not limited to, four-bladed rotors having wooden shutters and/or fabric sails. Moreover, the exemplary wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, the exemplary wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Wind turbine rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine." In the exemplary embodiment, generator rotor shaft 28 is coupled to rotor shaft 28 through a gearbox 32, although in other embodiments the generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

In one aspect. exemplary wind turbine 10 includes one or more control systems embodied in a turbine control unit (TCU) 40 coupled to some or all of the components of wind turbine 10 for generally controlling operation of wind turbine 10 and/or some or all of the components thereof (whether or not such components are described and/or illustrated herein), and in particular for controlling the tip speed of the blades 24 to control the noise generated by the blades 24. For example, in the exemplary embodiment, control system(s) are coupled to a rotor control 41 for generally controlling rotor 18. In the exemplary embodiment, the TCU 40 is mounted within nacelle 16. However, additionally or alternatively, one or more control systems 40 may be remote from nacelle 16 and/or other components of wind turbine 10. In one aspect. the TCU 40 may be used for, but is not limited to, power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. In one aspect, the yaw system 42 may be coupled to the TCU 40 for control thereby. In some embodiments, wind turbine 10 may include anemometry 46 for measuring wind speed and/or wind direction. Anemometry 46, in some embodiments, may be coupled to the TCU 40 for sending measurements to control system(s) for processing thereof. For example, although anemometry 46 may be coupled to the TCU 40 for sending measurements thereto for controlling other operations of wind turbine 10, anemometry 46 may send measurements to the TCU 40 for controlling and/or changing a yaw of rotor 18 using yaw system 42. Alternatively, anemometry 46 may be coupled directly to yaw system 42 for controlling and/or changing a yaw of rotor 18.

In one aspect, the exemplary wind turbine 10 may also include a plurality of sensors 48 (FIG. 3), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to the TCU 40 for sending pitch measurements to control system(s) for processing thereof.

Wind turbine 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 3) coupled to generator 26 for measuring an electrical power output of generator 26. In some embodiments, sensor(s) 54 are coupled to the TCU 40 for sending measurements to control system(s) for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 3) coupled to the TCU 40 for sending measurements to control system(s) for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, movements, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

In one aspect, the wind turbine 10 can include a variable blade pitch system 56 for controlling, including but not limited to changing, a pitch angle of rotor blades 24 (shown in FIGS. 1-3) in response to a condition such as wind speed.

Referring again to FIG. 3, in some embodiments, the TCU 40 can include a bus 62 or other communications device to communicate information. One or more processor(s) 64 can be coupled to bus 62 to process information, including information from anemometry 46, sensors 48, 50, 52, 54 and/or 55, and/or other sensor(s). The TCU 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. The TCU 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) and/or to provide outputs, such as, but not limited to, yaw control and/or pitch control outputs. Furthermore, in one aspect the TCU 40 interfaces with a supervisory control and data acquisition (SCADA) system (not shown) through the input/output device 72. The SCAD system can be used to collect and monitor data from the wind turbine 10 as well as to provide control commands to the TCU 40. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. In one aspect, the TCU 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

As noted above, in one aspect the TCU 40 can operate in conjunction with a supervisory control and data acquisition (SCADA) system to dynamically monitor and control wind turbine(s) 10 or wind farm(s). The SCADA system can include a Human-Machine Interface (HMI), a supervisory (computer) system, Remote Terminal Units (RTUs), and a communication infrastructure. The HMI is an apparatus that presents performance-related information to the operator. By using the HMI, the operator can monitor and/or control operation of wind turbine(s) 10 and/or wind farm(s). In one aspect, the HMI includes a graphical user interface (GUI) that allows the operator to interface with the wind farm in a graphical manner. The supervisory system monitors wind turbine(s) 10 and/or wind farm(s) by gathering and/or acquiring information (in the form of data). Also, the supervisory system controls wind turbine(s) 10 and/or wind farm(s) by transmitting commands to wind turbine(s) 10 and/or wind farm(s). The RTUs receive signals from anemometry 46, sensors 48, 50, 52, 54 and/or 55, and/or other sensor(s), convert the signals into digital data, and transmit the digital data to the supervisory system via the communication infrastructure (for example, optical fibers). In one aspect, the TCU 40 comprises an RTU. In one aspect, in addition to the wind turbines 10, the wind farm comprises one or more substation and meteorological stations, each having separate RTUs.

The SCADA system acts as a "nerve center" for wind turbine(s) 10 and/or wind farm(s). The SCADA system continuously analyzes the performance-related information and transmits signals to the GUI so that the performance-related information is visually depicted in a dynamic manner. The SCADA system can monitor and/or control wind turbine(s) 10 and wind farm(s), one or more substations (not shown), and one or more meteorological stations (not shown) thus allowing the operator to cohesively monitor and/or control wind turbine(s) 10 at a specific location, a wind farm, or any other suitable grouping of wind turbines 10. The SCADA system stores periodic records throughout a given period of time. The periodic records can be based upon activity at the specific location, the wind farm, or any other suitable grouping of wind turbines 10. The periodic records can be analyzed to provide the operator with performance-related information. The performance-related information can be used for implementing corrective action. The SCADA system implements requirements based upon connection agreements to control reactive power production, to contribute to network voltage or frequency control, or to limit power output in response to instructions from a network operator.

The technical effect of the SCADA system is to provide basic displays for the operator and dynamic displays 80 for the operator. The basic displays include intuitive tools for operation and maintenance of wind turbine(s) 10 and/or wind farm(s). For example, the basic display may include production reports regarding wind turbine monitoring and control, a visual representation identifying the mode of wind turbine(s) 10 and/or wind farm(s), wind farm power and/or wind speed as a recent time plot of wind speed and generated power, and/or a visual representation identifying the status of wind turbine(s) 10 and/or wind farm(s) superimposed on a detailed geographical map. The basic displays may be available through specific applications. For example, a viewer application may provide information relating to operation and maintenance of wind turbine(s) 10 and/or wind farms(s). The viewer application may be available on-site or remotely. The remote access to the viewer application may be through an Internet connection, a telephone line, a satellite signal, a radio signal, or any other suitable communication method. The communication method may be secure by any suitable measure(s). Suitable measure(s) may be encryption of any signal (for example, 40 bit encryption, 128 bit encryption, 256 bit encryption, etc.), recording all executed activity as an audit trail, limiting access to predetermined applications and/or functions of the SCADA system, or other suitable measures.

Figure 4:
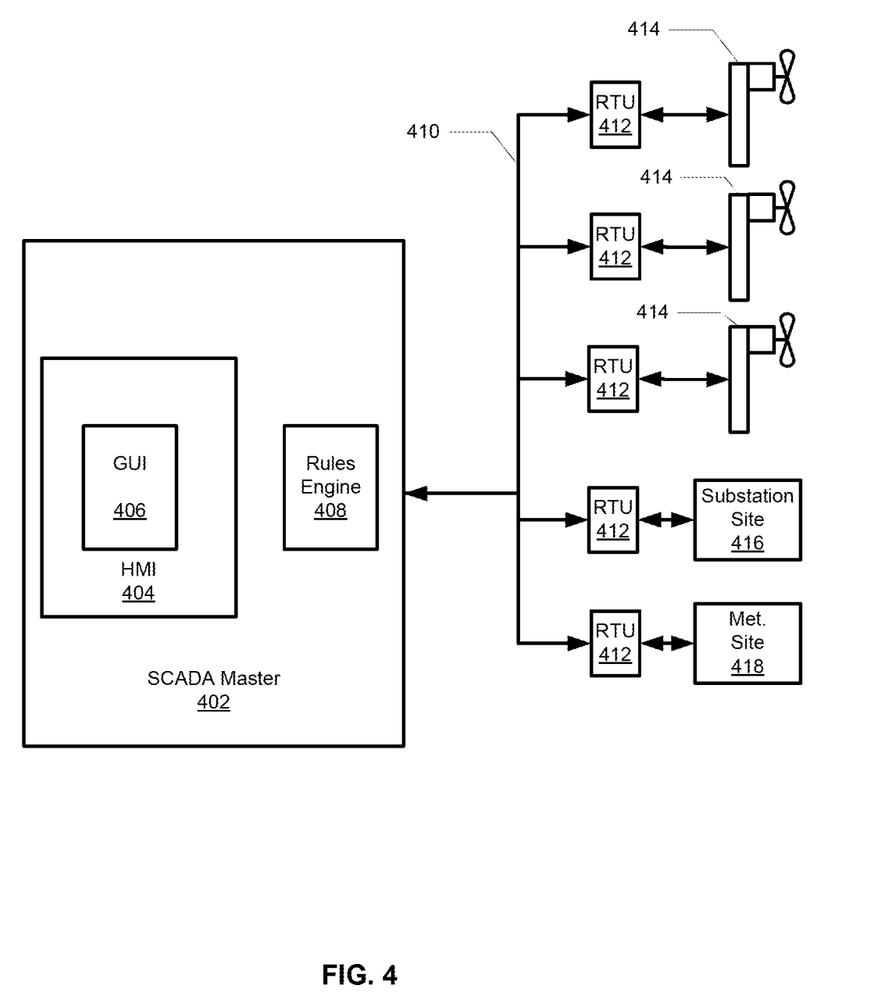
FIG. 4 is an overview block diagram of an embodiment of a wind farm system as described herein.

FIG. 4 provides an overview block diagram of an embodiment of a wind farm system as described above. A computing device 402 that can be used as a SCADA-master is comprised of a HMI 404. The HMI 404 further comprises a GUI 406 than can be used by an operator to interact with SCADA data from the wind farm in a graphical manner. Further comprising the embodiment of the system shown in FIG. 4 is a rules engine 408. Though in FIG. 4 the rules engine 408 is shown implemented on the SCADA-master 402, it is to be appreciated that the rules engine can be implemented on a separate computing device. The SCADA-master 402 communicates over a network 410 with various remote terminal units (RTUs) 412. The network 410 can be wired (including fiber optic or other non-conductive mediums), wireless or a combination thereof as known to one of ordinary skill in the art. In one aspect, the RTUs can comprise turbine control units (TCUs), substation control units (SCUs), meteorological control units (MCUs), and the like. Further comprising the system of FIG. 4 are one or more wind turbines 414, one or more substations 416 and one or more meteorological stations 418.

In one aspect, the GUI 406 can be used to provide a dynamic interactive interface for configuring rules (calculations). In one aspect, the rules comprise configuration of SCADA data for the wind farm on a SCADA system such as the one shown in FIG. 4 by an operator using the GUI 406. Generally, as shown in FIG. 4, the GUI 406 is implemented on the supervisory (computer) system (or SCADA-master) 402 of the SCADA system in concert with a rules engine 408. The SCADA-master 402 can be comprised of one or more computing devices. In one aspect, embodiments of a method, system and computer program product are described that enable an operator to define rules for user formulae and also a method of providing an interactive interface for configuring the rules. A system comprising a GUI 406 and a rules engine 408, both implemented on a computing device such as the SCADA-master 402, enable an operator to define his or her own rules ranging from simple calculations such as arithmetic calculations, logic and logical calculations, and the like, to some complex calculations such as summation, average, etc. In one aspect, an operator is able to create rules for executing those formulae using the GUI 406. In one aspect, the rules are built using the GUI 406 in concert with the rules engine 408. The rules engine 408 can build and execute rule expression trees that are specific to the SCADA system. For example, if an operator wants to create a rule on only a specific turbine parameter, the operator need not create rule for each turbine of the wind farm. In one aspect, the rules can be stored in the rules engine 408. In one aspect, the rules engine 408 can be used to sort and search rules based on keys (e.g. a specific turbine parameter).

In one aspect, a specialized syntax can be used by an operator for creating rules for SCADA data. In one aspect, the syntax can be designed for SCADA considering the turbine types, categories and related systems (e.g., substation, meteorological, etc.) that are present in the wind farm. In one aspect, the syntax combines a hierarchical tree structure of wind farms with the postfix notation of the logical and functional expressions. For example, usually expressions like a+b (INFIX), etc., are compiled by generic compilers into POSTFIX notation (ab+) and then are executed. In one aspect, a syntax used according to an embodiment of the present invention combines the postfix notation used for generic compilers with specific wind farm hierarchy (e.g., Turbines→TurbineTypes→Turbine). For example, a tag is desired that gives "Average Generator Temperature" for each turbine, instead of repeating the rule for each turbine of the wind farm, the syntax provides support for specifying the same in one LINE/WORD of the syntax. For example, according to an aspect of the syntax, SC {Turbines} means here "for all Turbines". So the rule would look like SC {TURBINES}=AVG {GeneratorTemp}, thus providing a rich syntax for specifying SCADA rules.

In one aspect, configurations of SCADA data can be propagated dynamically at run time and the SCADA-master and any RTUs 412 adapt to configuration changes in run time. For example, if a rule is created, the rules engine 408 is notified using an HTTP interface and the rules engine 408 automatically reads the newly created rule configuration and starts executing the rules and reports results in run time. In one aspect, at least a portion of the SCADA data can be dynamically configured for a selected group of the wind farm parameters using a graphical user interface (GUI) 406 that interfaces with the rules engine 408. In one aspect, the SCADA data can be configured using one or more operators. In one aspect, embodiments of the system can record and audit the performance and resource usage of the rules during their execution and generates reports to the operator, thereby helping him or her in making decisions on balancing system load with rule execution.

In one aspect, the GUI 406 can have various options to help an operator create rules. For example, for a novice operator, the GUI 406 can provide an intelligent picker to help in selecting appropriate SCADA parameters. For an experienced operator, the GUI 406 can provide a means for rules to be entered in free text without being hampered by fixed GUI elements. In one aspect, new rules can be defined using parameters such as name, description, system, and the like. In one aspect, the intelligent picker adapts itself dynamically as the operator is creating a rule. In one aspect, the picker makes intelligent decisions based on a rule that is being keyed in. For example, the picker can filter the selection of systems, data points and other wind farm parameters as the rule is being keyed in by an operator. In other words, the picker is context sensitive—if the rule is about a wind control, the picker will filter and display only the wind control system types and related data points from the SCADA data and present it to the user. In one aspect, the picker can also display the list of selected SCADA data based on a probability distribution of previous usage. That is, the most frequently used data points are most prominently displayed for selection by the operator developing the rule. Also, in one aspect, the picker can be used to select data points or system numbers using numbers or name key letters.

The technical effect of embodiments of the described invention is to provide an interface that compiles and executes rules developed by the operator that enables the operator to better analyze the wind farm being operated.

As shown in FIG. 4, a computing device such as SCADA-master 402 receives supervisory control and data acquisition (SCADA) data for a wind farm over the network 410 or retrieves stored data from a memory. In one aspect, the wind farm is comprised of one or more wind turbines 414. In one aspect, the wind farm is further comprised of one or more meteorological sites 418 and one or more substation sites 416. SCADA data includes parameters for the wind farm including control and operational parameters for the one or more wind turbines 414. In one aspect, the wind farm parameters include historical data and real-time data points. Real-time data points are tags that can be updated into the SCADA system every second from the wind farm (e.g., wind turbines, substation, meteorological controller, output of other rules, etc.). Examples of real-time data points for a wind farm include wind speed, turbine power (turbines), 50-meter wind direction (meteorological), KVarh import/export (substation), site power (output of aggregation rule), and the like. Historical data includes data inputs to the rules engine and outputs from the rules engine. Historical data inputs to the rules engine can include, for example, current month power production, current year down time, power production till date since commissioning, and the like. Historical data outputs from the rules engine can include, for example, average generator temperature since last 10 min, average power production since last week, and the like. All of these points, historical and real-time, can be configured using the GUI 406.

Using an HMI 404 that further comprises a GUI 406 that interfaces with a rules engine 408, an operator can dynamically configure at least a portion of the SCADA data for a selected group of the wind farm parameters. In one aspect, the rules engine 408 comprises rules for dynamically configuring at least a portion of the SCADA data for a selected group of the wind farm parameters. In one aspect, the dynamic configuration of the SCADA data using the one or more operators for a selected group of the wind farm parameters is implemented by the rules engine 408. In one aspect, the rules engine 408 implements the dynamically configured data in real-time. In one aspect, rules for the dynamic configuration of the SCADA data for a selected group of the wind farm parameters are stored in the rules engine 408. In one aspect, the rules stored in the rules engine 408 can be searched, filtered, grouped and sorted based on keys.

For example, in one aspect dynamically configuring at least a portion of the SCADA data for a selected group of the wind farm parameters using the GUI 406 that interfaces with a rules engine 408 comprises dynamically configuring at least a portion of the SCADA data for all of the one or more wind turbines 414 using the GUI 406 that interfaces with the rules engine 408. In another aspect, dynamically configuring at least a portion of the SCADA data for a selected group of the wind farm parameters using the GUI 406 that interfaces with the rules engine 408 comprises dynamically configuring at least a portion of the SCADA data for one of the one or more wind turbines 414 using the GUI 406 that interfaces with the rules engine 408. In yet another aspect, the one or more wind turbines 414 comprises a total of two or more wind turbines and dynamically configuring the SCADA data for a selected group of the wind farm parameters using the GUI 406 that interfaces with the rules engine 408 comprises dynamically configuring at least a portion of the SCADA data for less than the total wind turbines using the GUI 406 that interfaces with the rules engine 408. In one aspect, dynamically configuring at least a portion of the SCADA data for a selected group of the one or more wind turbines 414 using a GUI 406 that interfaces with the rules engine 408 comprises using a hierarchical selection process in the GUI as defined by the rules engine to configure the SCADA data. In one aspect, the hierarchical selection process comprises selecting the SCADA data in an order of wind farm, system, and data point.

The SCADA data can be configured using one or more operators. In one aspect, configuring the SCADA data using one or more operators comprises configuring the SCADA data using one or more of addition, subtraction, multiplication, division, Boolean logic, summation, and averaging. Once configured, at least a portion of the dynamically configured data can be output using, for example, a display of the SCADA-master 402, a printer, or the like.

In one aspect, an operator can use the GUI 406 to establish one or more alarm parameters for at least one of the wind farm parameters. Once the alarm parameters are established, one or more alarms can be provided when the at least one wind farm parameter violates the one or more alarm parameters.

In one aspect, the GUI 406 further comprises an intelligent and context sensitive picker. Dynamically configuring at least a portion of the SCADA data for a selected group of the wind farm parameters using the GUI 406 that interfaces with a rules engine 408 can comprise dynamically configuring selected data points and systems for the wind farm using the picker.

Figure 5:
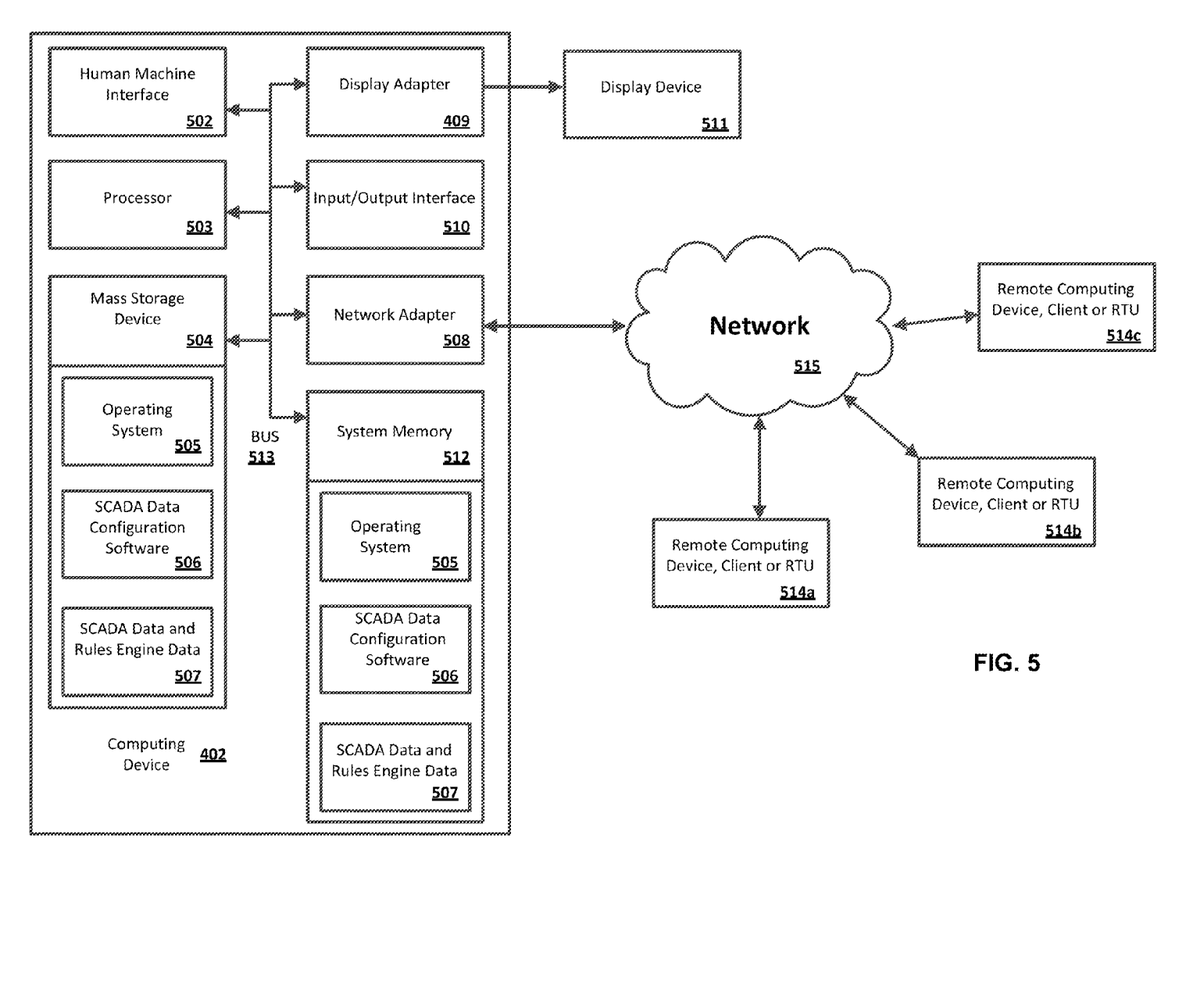
FIG. 5 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit, such as a GUI 06, rules engine 408 and the like can be software, hardware, or a combination of software and hardware. The units can comprise the SCADA data configuration software 506 as illustrated in FIG. 5 and described below. In one exemplary aspect, the units can comprise a computing device 402 as illustrated in FIG. 5 and described below.

FIG. 5 is a block diagram illustrating an exemplary operating environment for performing the disclosed methods. FIG. 5 also illustrates an exemplary computing device 402 that can be used as a SCADA-master according to embodiments of the present invention. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, remote terminal units, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 402. The components of the computing device 402 can comprise, but are not limited to, one or more processors or processing units 503, a system memory 512, and a system bus 513 that couples various system components including the processor 503 to the system memory 512. In the case of multiple processing units 503, the system can utilize parallel computing. In one aspect, the one or more processors or processing units 503 can be configured to receive supervisory control and data acquisition (SCADA) data for a wind farm comprised of one or more wind turbines, wherein the SCADA data includes parameters for the wind farm; dynamically configure at least a portion of the SCADA data for a selected group of the wind farm parameters using a graphical user interface (GUI) that interfaces with a rules engine, wherein the SCADA data is configured using one or more operators; and display at least a portion of the dynamically configured data using a display.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, SCADA data configuration software 506, SCADA data and rules engine data 507, a network adapter 508, system memory 512, an Input/Output Interface 510, a display adapter 509, a display device 511, and a human machine interface further comprising a graphical user interface (GUI) 502, can be contained within one or more remote computing devices, clients or remote terminal units (RTUs) 514a,b,c at physically separate locations, connected through buses of this form, in effect implementing a fully distributed system or distributed architecture.

The computing device 402 typically comprises a variety of computer readable media. Exemplary readable media can be any available media that is non-transitory and accessible by the computing device 402 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as SCADA data and rules engine data 507 and/or program modules such as operating system 505 and SCADA data configuration software 506 that are immediately accessible to and/or are presently operated on by the processing unit 503.

In another aspect, the computing device 402 can also comprise other non-transitory, removable/non-removable, volatile/non-volatile computer storage media. By way of example, FIG. 5 illustrates a mass storage device 504 that can provide non-volatile storage of computer code, computer readable instructions, data structures, program modules, and other data for the computing device 402. For example, and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and SCADA data configuration software 506. Each of the operating system 505 and SCADA data configuration software 506 (or some combination thereof) can comprise elements of the programming and the SCADA data configuration software 506. SCADA data and rules engine data 507 can also be stored on the mass storage device 504. SCADA data and rules engine data 507 can be stored in any of one or more databases known in the art Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 402 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computing device 402 can have more than one display adapter 509 and the computing device 402 can have more than one display device 511. For example, a display device can be a monitor, an LCD (Liquid Crystal Display), or a projector. In addition to the display device 511, other output peripheral devices can comprise components such as speakers (not shown) and a printer (not shown), which can be connected to the computing device 402 via Input/Output Interface 510. Any step and/or result of the methods can be output in any form to an output device. Such output can be any form of visual representation, including, but not limited to, textual, graphical, animation, audio, tactile, and the like.

The computing device 402 can operate in a networked environment using logical connections to one or more remote computing devices, clients or RTUs 514a,b,c. By way of example, a remote computing device 514 can be a personal computer, portable computer, a server, a router, a network computer, a smart meter, a vendor or manufacture's computing device, smart grid components, a peer device, an RTU, or other common network node, and so on. Logical connections between the computing device 402 and a remote computing device, client or RTU 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and other networks 515.

For purposes of illustration, application programs and other executable program components such as the operating system 505 are illustrated herein as discrete blocks, although it is recognized that such programs and components reside at various times in different storage components of the computing device 402, and are executed by the data processor(s) of the computer. An implementation of SCADA data configuration software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Figure 6A:
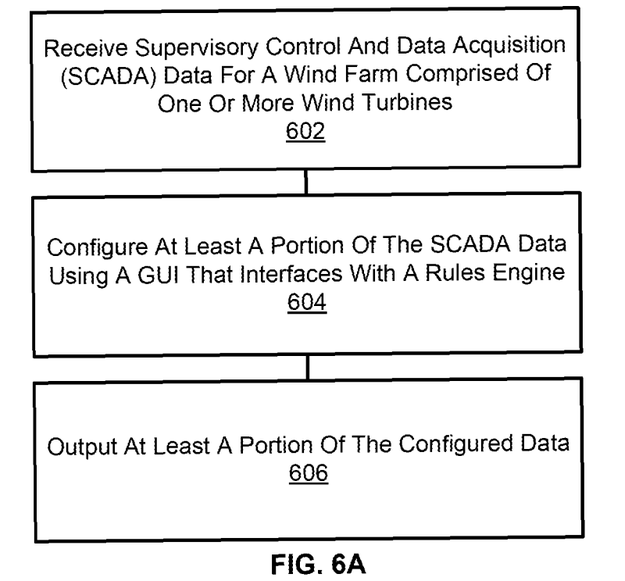
FIG. 6A is a flowchart that illustrates an embodiment of a method of configuring rules for SCADA data of a wind farm.

FIG. 6A is a flowchart that illustrates an embodiment of a method of configuring rules for SCADA data of a wind farm. The embodiment of a method comprises step 602, receiving supervisory control and data acquisition (SCADA) data for a wind farm comprised of one or more wind turbines. The SCADA data includes parameters for the wind farm. At step 604, at least a portion of the SCADA data for a selected group of the wind farm parameters is configured using a graphical user interface (GUI) that interfaces with a rules engine. The SCADA data is configured using one or more operators. At step 606, at least a portion of the dynamically configured data is output.

Figure 6B:
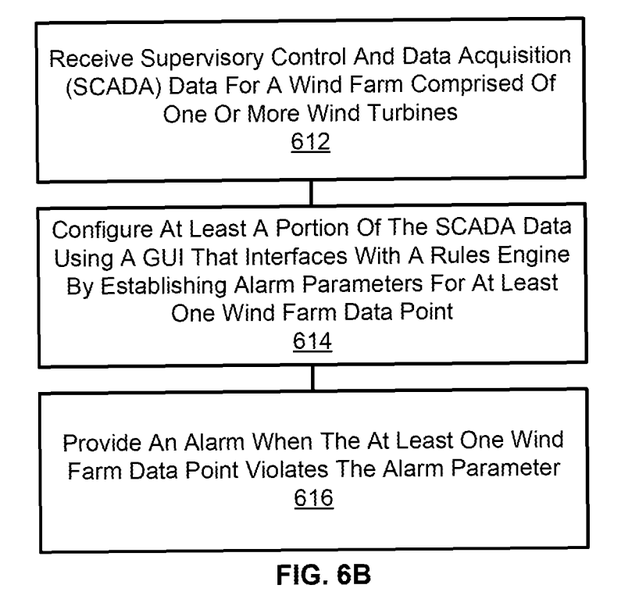
FIG. 6B is a flowchart that illustrates another embodiment of a method of configuring rules for SCADA data of a wind farm.

FIG. 6B is a flowchart that illustrates another embodiment of a method of configuring rules for SCADA data of a wind farm. The embodiment of a method comprises step 612, receiving supervisory control and data acquisition (SCADA) data for a wind farm comprised of one or more wind turbines. The SCADA data includes data points for the wind farm. At step 614, at least a portion of the SCADA data for a selected group of the wind farm parameters is configured using a graphical user interface (GUI) that interfaces with a rules engine by establishing alarm parameters for at least one wind farm data point. In one aspect, configuring the SCADA data comprises configuring data for checking threshold levels (alarm conditions) using the GUI that interfaces with the rules engine. The SCADA data can be configured using one or more operators. At step 616, an alarm is provided when that at least one wind farm data point violates the established alarm parameter. In one aspect, the alarms are generated whenever the alarm conditions are met and made available in an alarm viewer (part of the GUI).

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 503 discussed above with reference to FIG. 5, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 503 of FIG. 5) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of configuring rules for SCADA data of a wind farm comprising:
    receiving supervisory control and data acquisition (SCADA) data for a wind farm comprised of one or more wind turbines, wherein said SCADA data includes parameters for the wind farm;
    dynamically configuring at least a portion of the SCADA data for a selected group of the wind farm parameters using a graphical user interface (GUI) that interfaces with a rules engine, wherein said SCADA data is configured using one or more operators; and
    outputting at least a portion of the dynamically configured data,
    wherein the GUI comprises a dynamic context sensitive picker for entering a rule into the rules engine, wherein the dynamic context sensitive picker filters and dynamically displays the SCADA data being received based upon the selected group of wind farm parameters for the rule being entered, said filtering and display based on a probability distribution of previous usage of the SCADA data for the selected group of wind farm parameters and the filtering and display occurring concurrently and dynamically with the entering of the rule.

2. The method of claim 1, further comprising establishing one or more alarm parameters for at least one of the wind farm parameters and providing one or more alarms when the at least one wind farm parameter violates the one or more alarm parameters.

3. The method of claim 1, wherein the wind farm is further comprised of one or more meteorological sites and one or more substation sites.

4. The method of claim 1, wherein the parameters for the wind farm include historical data and real-time data points.

5. The method of claim 1, wherein dynamically configuring at least a portion of the SCADA data for a selected group of the wind farm parameters using the GUI that interfaces with a rules engine comprises dynamically configuring at least a portion of the SCADA data for either all of the one or more wind turbines, or for one of the one or more wind turbines, using the GUI that interfaces with the rules engine.

6. The method of claim 1, wherein dynamically configuring the SCADA data for a selected group of the wind farm parameters using the GUI that interfaces with the rules engine comprises dynamically configuring at least a portion of the SCADA data for fewer than all of the one or more wind turbines using the GUI that interfaces with the rules engine if there are more than one wind turbine.

7. The method of claim 1, wherein the dynamic configuration of the SCADA data using the one or more operators for a selected group of the wind farm parameters is implemented by the rules engine.

8. The method of claim 1, wherein the rules engine comprises rules for dynamically configuring at least a portion of the SCADA data for a selected group of the wind farm parameters.

9. The method of claim 1, further comprising storing rules for the dynamic configuration of the SCADA data for a selected group of the wind farm parameters in the rules engine.

10. A system comprised of:
    a memory;
    a display; and
    a processor, wherein the processor is operably connected with the memory and the display, and the processor is configured to:
        receive supervisory control and data acquisition (SCADA) data for a wind farm comprised of one or more wind turbines, wherein said SCADA data includes parameters for the wind farm;
        dynamically configure at least a portion of the SCADA data for a selected group of the wind farm parameters using a graphical user interface (GUI) that interfaces with a rules engine, wherein said SCADA data is configured using one or more operators; and
        display at least a portion of the dynamically configured data using the display,
        wherein the GUI comprises a dynamic context sensitive picker for entering a rule into the rules engine, wherein the dynamic context sensitive picker filters and dynamically displays the SCADA data being received based upon the selected group of wind farm parameters for the rule being entered, said filtering and display based on a probability distribution of previous usage of the SCADA data for the selected group of wind farm parameters and the filtering and display occurring concurrently and dynamically with the entering of the rule.

11. The system of claim 10, wherein the processor is further configured to establish one or more alarm parameters for at least one of the wind farm parameters and to provide one or more alarms when the at least one wind farm parameter violates the one or more alarm parameters.

12. The system of claim 10, wherein the wind farm is further comprised of one or more meteorological sites and one or more substation sites.

13. The system of claim 10, wherein the parameters for the wind farm include historical data and real-time data points.

14. The system of claim 10, wherein the processor is configured to dynamically configure at least a portion of the SCADA data for either all of the one or more wind turbines, or for one of the one or more wind turbines, using the GUI that interfaces with the rules engine.

15. The system of claim 10, wherein the processor is configured to dynamically configure at least a portion of the SCADA data for fewer than the all of the one or more wind turbines using the GUI that interfaces with the rules engine if there are more than one wind turbine.

16. The system of claim 10, wherein the dynamic configuration of the SCADA data using the one or more operators for a selected group of the wind farm parameters is implemented by the rules engine.

17. The system of claim 10, wherein the rules engine comprises rules for dynamically configuring at least a portion of the SCADA data for a selected group of the wind farm parameters.

18. The system of claim 10, further comprising storing rules for the dynamic configuration of the SCADA data for a selected group of the wind farm parameters in the rules engine, wherein at least a portion of the rules engine is stored on the memory.

19. A computer program product comprised of computer-executable code sections stored on a non-transitory computer readable medium, said computer-executable code sections comprising:

a first section for receiving supervisory control and data acquisition (SCADA) data for a wind farm comprised of one or more wind turbines, wherein said SCADA data includes parameters for the wind farm;

a second section for dynamically configuring at least a portion of the SCADA data for a selected group of the wind farm parameters using a graphical user interface (GUI) that interfaces with a rules engine, wherein said SCADA data is configured using one or more operators; and     a third section for outputting at least a portion of the dynamically configured data, wherein the GUI comprises a dynamic context sensitive picker for entering a rule into the rules engine, wherein the dynamic context sensitive picker filters and dynamically displays the SCADA data being received based upon the selected group of wind farm parameters for the rule being entered, said filtering and display based on a probability distribution of previous usage of the SCADA data for the selected group of wind farm parameters and the filtering and display occurring concurrently and dynamically with the entering of the rule.

\* \* \* \* \*